United States Patent
Hara et al.

(10) Patent No.: US 9,777,218 B2
(45) Date of Patent: Oct. 3, 2017

(54) LIQUID CRYSTAL DISPLAY ELEMENT

(71) Applicant: DIC CORPORATION, Tokyo (JP)

(72) Inventors: Tomoaki Hara, Kita-adachi-gun (JP); Wei Wu, Kita-adachi-gun (JP); Shotaro Kawakami, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/779,508

(22) PCT Filed: Mar. 18, 2014

(86) PCT No.: PCT/JP2014/057286
§ 371 (c)(1),
(2) Date: Oct. 20, 2015

(87) PCT Pub. No.: WO2014/156815
PCT Pub. Date: Oct. 2, 2014

(65) Prior Publication Data
US 2016/0060523 A1    Mar. 3, 2016

(30) Foreign Application Priority Data
Mar. 25, 2013 (JP) .................................. 2013-062039

(51) Int. Cl.
*G02F 1/1337* (2006.01)
*C09K 19/30* (2006.01)
(Continued)

(52) U.S. Cl.
CPC ...... *C09K 19/3066* (2013.01); *C09K 19/2014* (2013.01); *C09K 19/542* (2013.01);
(Continued)

(58) Field of Classification Search
CPC ......... G02F 1/133703; G02F 1/133711; G02F 1/133788; G02F 2001/133742;
(Continued)

(56) References Cited

U.S. PATENT DOCUMENTS

2008/0024705 A1*  1/2008  Hasegawa ......... G02F 1/133711
                                                        349/123
2008/0111107 A1*  5/2008  Kawakami ......... C09K 19/3066
                                                        252/299.63
(Continued)

FOREIGN PATENT DOCUMENTS

CN        105122127 A    12/2015
EP          2980640 A1    2/2016
(Continued)

OTHER PUBLICATIONS

International Search Report dated Jun. 17, 2014, issued in counterpart International Application No. PCT/JP2014/057286 (1 page).

*Primary Examiner* — Sophie Hon
(74) *Attorney, Agent, or Firm* — Westerman, Hattori, Daniels & Adrian, LLP

(57) ABSTRACT

The present invention relates to a PSA-mode liquid crystal display device including a polymer produced by polymerizing a polymerizable compound by energy ray irradiation in a state in which a mixture of the polymerizable compound and a liquid crystal composition is held between the first substrate and the second substrate, the polymer having a number-average molecular weight of 50,000 or more in terms of polystyrene. In a PSA-mode display device in which alignment of liquid crystal molecules substantially vertically aligned between the substrates is controlled by applying a voltage, a pre-tilt angle can be properly given without being inhibited. Therefore, the present invention provides a PSA-mode display device with good alignment stability, uniform alignment within the substrates, and no or suppressed display defects and a method for producing the same.

4 Claims, 4 Drawing Sheets

(51) Int. Cl.
*C09K 19/20* (2006.01)
*C09K 19/04* (2006.01)
*C09K 19/12* (2006.01)
*C09K 19/54* (2006.01)
*C08F 220/18* (2006.01)
*C08F 220/30* (2006.01)

(52) U.S. Cl.
CPC .. *G02F 1/133711* (2013.01); *G02F 1/133788* (2013.01); *C08F 220/18* (2013.01); *C08F 220/30* (2013.01); *C09K 2019/0448* (2013.01); *C09K 2019/122* (2013.01); *C09K 2019/123* (2013.01); *C09K 2019/124* (2013.01); *C09K 2019/301* (2013.01); *C09K 2019/3004* (2013.01); *C09K 2019/3016* (2013.01); *C09K 2019/3037* (2013.01); *C09K 2019/548* (2013.01); *C09K 2219/03* (2013.01); *G02F 2001/133742* (2013.01); *Y10T 428/1005* (2015.01)

(58) Field of Classification Search
CPC ...... C09K 19/03; C09K 19/56; C09K 19/542; C09K 19/584; C09K 2019/0448; C09K 2019/122–2019/124; C09K 2019/301; C09K 2019/3004; C09K 2019/3016; C09K 2019/3037; Y10T 428/1005
See application file for complete search history.

(56) References Cited

U.S. PATENT DOCUMENTS

| | | |
|---|---|---|
| 2009/0207357 A1 | 8/2009 | Tashiro et al. |
| 2011/0253933 A1 | 10/2011 | Hirata et al. |
| 2011/0299018 A1* | 12/2011 | Itoh .............. C09K 19/586 349/123 |
| 2012/0092608 A1 | 4/2012 | Ito et al. |
| 2012/0292568 A1 | 11/2012 | Kuriyama et al. |

FOREIGN PATENT DOCUMENTS

| | | |
|---|---|---|
| JP | 2002-357830 A | 12/2002 |
| JP | 2003-307720 A | 10/2003 |
| JP | 2008-116931 A | 5/2008 |
| JP | 2009-102639 A | 5/2009 |
| JP | 2010-256904 A | 11/2010 |
| JP | 2011-227187 A | 11/2011 |
| JP | 2011227187 A | 11/2011 |
| JP | 2012241124 A | 12/2012 |
| KR | 20150106894 A | 9/2015 |
| TW | 201502146 A | 1/2015 |
| WO | 2008018213 A1 | 2/2008 |
| WO | 2010/098059 A1 | 9/2010 |
| WO | 2010131600 A1 | 11/2010 |

\* cited by examiner

LIQUID CRYSTAL DISPLAY ELEMENT

TECHNICAL FIELD

The present invention relates to a liquid crystal display device useful as a constituent member of liquid crystal TV and the like and a method for manufacturing the device.

Liquid crystal display devices have been used for watches and electronic calculators, various home electric appliances, measuring apparatuses, automotive panels, word processors, electronic notebooks, printers, computers, televisions, etc. Typical examples of a liquid crystal display mode include a TN (twisted nematic) mode, a STN (super twisted nematic) mode, a DS (dynamic light scattering) mode, a GH (guest host) mode, an IPS (in-plane switching) mode, an OCB (optically compensated birefringence) mode, an ECB (electrically controlled birefringence) mode, a VA (vertical alignment) mode, a CSH (color super homeotropic) mode, a FLC (ferroelectric liquid crystal), and the like. Also, examples of a driving method include static driving, multiplex driving, simple matrix method, and an active matrix (AM)) method of driving by TFT (thin-film transistor), TFD (thin-film diode), or the like.

Among these display modes, the IPS mode, the ECB mode, the VA mode, the CSH mode, or the like is characterized by using a liquid crystal material showing a negative value of $\Delta\in$. Among these, in particular, the VA display mode by AM driving is used for applications to display devices required to exhibit a high speed and a wide viewing angle, for example, televisions and the like.

A VA-mode display uses a liquid crystal composition having negative $\Delta\in$ and is widely used for liquid crystal TV etc. On the other hand, low-voltage driving, fast response, and a wide operating temperature range are required for all driving methods. That is, a large absolute value of $\Delta\in$, low viscosity ($\eta$), and a high nematic-isotropic liquid phase transition temperature ($T_{ni}$) are required. Also, in view of setting of $\Delta n \times d$ which is the product of $\Delta n$ and a cell gap (d), it is necessary to adjust $\Delta n$ of a liquid crystal composition within a proper range according to the cell gap. In addition, when a liquid crystal display device is applied to a television or the like, fast response is regarded as important, and thus a liquid crystal composition having low rotational viscosity ($\gamma_1$) is required.

On the other hand, use leads to wide use of a MVA (multi-domain vertical alignment) mode liquid display device in which in order to improve the viewing angle characteristic of a VA-mode display, the alignment direction of liquid crystal molecules in a pixel is divided into plural directions by providing a projecting structure on a substrate. The MVA-mode liquid crystal display device has excellent viewing angle characteristics but has a problem in which the vicinity of the projecting structure and a portion far from the projecting structure on the substrate have different response speeds and the response speed as a whole is unsatisfactory because of the influence of liquid crystal molecules at low response speed in the portion far from the projecting structure, thereby causing the problem of degrading transmittance due to the projecting structure. In order to resolve the problem, a PSA liquid crystal display device (polymer stabilized alignment, including a PS liquid crystal display device (polymer stabilized)) is developed as a method for giving a uniform pre-tilt angle in a divided pixel without providing a non-transmissive projecting structure in a cell unlike in a usual MVA-mode liquid display device. The PSA liquid crystal display device is manufactured by adding a small amount of reactive monomer to a liquid crystal composition, introducing the liquid crystal composition into a liquid crystal cell, and then polymerizing the reactive monomer in the liquid crystal composition by irradiation with active energy rays while applying a voltage between electrodes. Therefore, a proper pre-tilt angle can be given to the divided pixel, and, as a result, contrast can be improved due to improvement in transmittance and fast response can be achieved by giving a uniform pre-tilt angle (for example, refer to Patent Literature 1).

A problem of the PSA-mode liquid crystal display device is to apply a pre-tilt angle by active energy ray irradiation within a short time and to decrease unreacted monomers having an adverse effect on the display device. In order to resolve the problem, specified liquid crystal compositions are investigated (refer to Patent Literature 2). Also, in order to apply a proper pre-tilt angle and achieve fast response at high resistance, compositions each including combination of a specified liquid crystal compound and a specified reactive monomer is investigated (refer to Patent Literature 3).

Further, another problem is the occurrence of a display defect due to image sticking or the like. The known causes of image sticking are impurities and a change with time in alignment of liquid crystal molecules (change with time in a pre-tilt angle). An example of the cause of a change in a pre-tilt angle is that when a polymer which is a cured product of a polymerizable compound is flexible, the polymer structure is changed in long-term continuous display of the same pattern in a liquid crystal display device, resulting in a change in the pre-tilt angle in some cases. In order to solve the problem, a PSA-mode display device (refer to Patent Literature 4) using a polymerizable compound having a structure of a 1,4-phenylene group or the like and a PSA-mode display device (refer to Patent Literature 5) using a polymerizable compound having a biaryl structure are investigated.

The problem of a display defect associated with liquid crystal molecule alignment in a PSA-mode display device having useful display performance is attempted to be resolved by optimizing a polymerizable compound. On the other hand, there are new problems with alignment control in which application of a pre-tilt angle of liquid crystal molecules in a PSA-mode display device is inhibited, and a nonuniform display defect occurs due to partially nonuniform pre-tilt angles in a substrate.

Thus, in addition to display performance (contrast, response speed, etc.) required for a vertical alignment-mode display device such as the VA mode or the like, it is necessary to satisfy the requirements such as the formation of a proper pre-tilt angle required for display quality of a PSA-mode display device, stability of the pre-tilt angle with time, maintenance of a uniform alignment state, etc.

CITATION LIST

Patent Literature

PTL 1: Japanese Unexamined Patent Application Publication No. 2002-357830
PTL 2: Japanese Unexamined Patent Application Publication No. 2010-256904
PTL 3: Japanese Unexamined Patent Application Publication No. 2009-102639
PTL 4: Japanese Unexamined Patent Application Publication No. 2003-307720

PTL 5: Japanese Unexamined Patent Application Publication No. 2008-116931

SUMMARY OF INVENTION

Technical Problem

A problem to be solved by the present invention is to provide a PSA-mode liquid crystal display device in which liquid crystal molecules are substantially vertically aligned between substrates, and the alignment of the liquid crystal molecules is controlled by applying a voltage, and in which a pre-tilt angle is appropriately given without inhibiting the formation of the pre-tilt angle of the liquid crystal molecules, thereby causing good alignment stability and uniform alignment within a substrate with no or suppressed display defects, and also provide a method for manufacturing the display device.

Solution to Problem

As a result of research of a pre-tilt angle in a liquid crystal display device in order to resolve the problems described above, the inventors found that the problems can be resolved by using a specified polymer for controlling an alignment direction of liquid crystal molecules in a liquid crystal display device, leading to the achievement of the present invention.

That is, the present invention provides a liquid crystal composition of the present invention including a first substrate having a common electrode, a second substrate having a pixel electrode, a liquid crystal composition layer held between the first substrate and the second substrate, a polymer that regulates an alignment direction of a liquid crystal composition, and a vertical alignment film provided on at least one of the first substrate and the second substrate, the alignment direction of liquid crystal molecules in the liquid crystal composition layer being controlled by the vertical alignment film to be substantially vertical to the first substrate and the second substrate on the sides adjacent to the liquid crystal composition layer, and the liquid crystal molecules in the liquid crystal composition layer being controlled by applying, between the common electrode and the pixel electrodes, a voltage substantially vertically to the first substrate and the second substrate, wherein the polymer has a number-average molecular weight of 50,000 or more in terms of polystyrene. Also, the present invention provides a method for manufacturing the liquid crystal display device.

Advantageous Effects of Invention

A liquid crystal display device of the present invention achieves the formation of a good pre-tilt angle and has a uniform alignment state within a substrate and high display quality with no or suppressed display defects, and can be effectively used as a display device for liquid crystal TV, a monitor, and the like. Also, according to the present invention, a liquid crystal display device with high display quality can be manufactured.

DESCRIPTION OF EMBODIMENTS

A liquid crystal display device and a method for manufacturing the same according to embodiments of the present invention are described.

The embodiments are made to specifically describe the invention in order to make the gist of the invention more well understandable, and the present invention is not limited to the embodiments unless otherwise specified.

(Liquid Crystal Display Device)

A liquid crystal display device is one that has a liquid crystal composition layer held between a pair of electrodes, and is based on a principle that liquid crystal molecules in the liquid crystal composition layer are caused to function as an optical switch by Freedericksz transition induced by applying a voltage to the liquid crystal composition layer. In view of this point, a known common technique can be used.

Two substrates each have an electrode for inducing Freedericksz transition of liquid crystal molecules, and a usual vertical alignment liquid crystal display device generally uses a method in which a voltage is vertically applied between the two substrate. In this case, one of the electrodes serves as a common electrode, and the other electrode serves as a pixel electrode. The most typical example of this method is described below.

Figure 1:
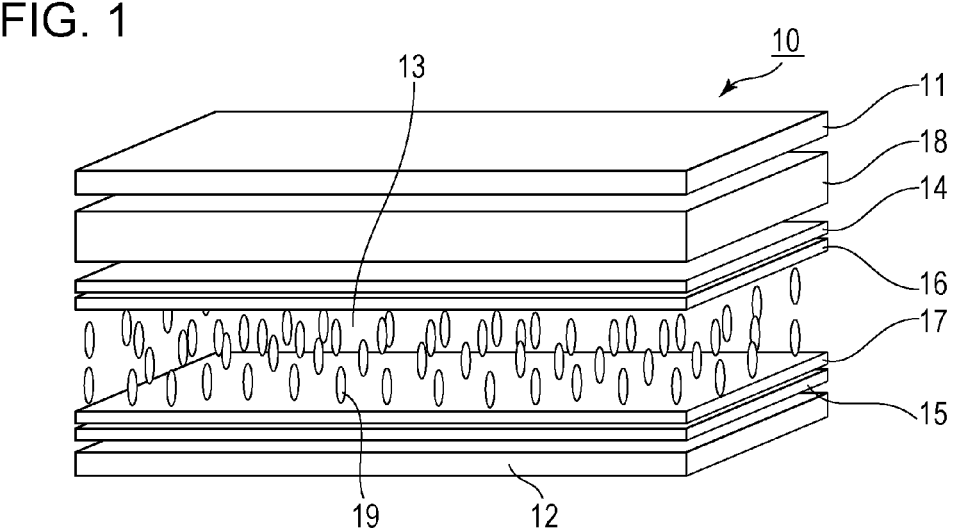
FIG. 1 is a schematic perspective view showing a liquid crystal display device according to an embodiment of the present invention.

FIG. 1 is a schematic perspective view showing a liquid crystal display device according to an embodiment of the present invention.

A liquid crystal display device 10 of the embodiment is schematically configured by a first substrate 11, a second substrate 12, a liquid crystal composition layer 13 held between the first electrode 11 and the second electrode 12, a common electrode 14 provided on a surface of the first substrate 11 so as to face the liquid crystal composition layer 13, a pixel electrode 15 provided on a surface of the second substrate 12 so as to face the liquid crystal composition layer 13, a vertical alignment film 16 provided on a surface of the common electrode 14 so as to face the liquid crystal composition layer 13, a vertical alignment film 17 provided on a surface of the pixel electrode 15 so as to face the liquid crystal composition layer 13, and a color filter 18 provided between the first substrate 11 and the common electrode 14.

A glass substrate or plastic substrate is used as each of the first substrate 11 and the second substrate 12.

Examples of the plastic substrate used include substrates composed of resins such as an acryl resin, a methacryl resin, polyethylene terephthalate, polycarbonate, a cyclic olefin resin, and the like.

The common electrode 14 is generally composed of a material with transparency, such as indium-added tin oxide (ITO) or the like.

The pixel electrode 15 is generally composed of a material with transparency, such as indium-added tin oxide (ITO) or the like.

The pixel electrode 15 is disposed in a matrix shape on the second substrate 12. The pixel electrode 15 is controlled by a drain electrode of an active element represented by a TFT switching element, and the TFT switching element has a matrix of gate lines serving as address signal lines and source lines serving as data lines. The configuration of the TFT switching element is not shown.

When a pixel is divided so that the falling direction of liquid crystal molecules in a pixel is divided into plural regions in order to improve viewing angle characteristics, a pixel electrode having slits (portions in which an electrode is not formed) having a stripe-shaped or V-shaped pattern may be provided in each pixel.

Figure 2:
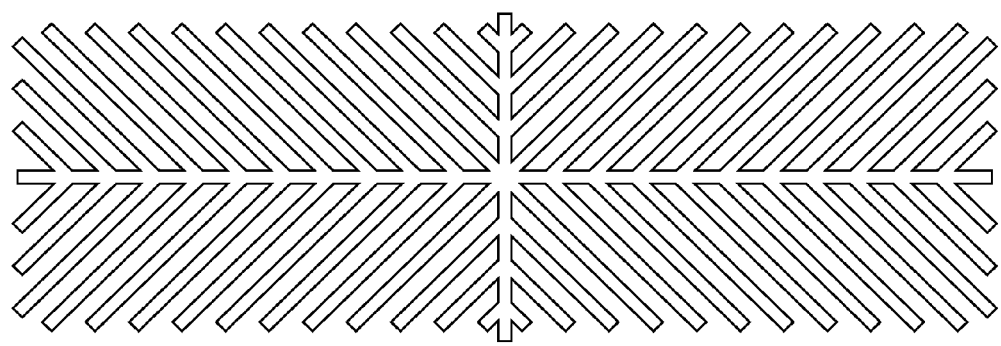
FIG. 2 is a schematic plan view of an example of a slit electrode (comb-shaped electrode) used in a liquid crystal display device of the present invention.

FIG. 2 is a schematic plan view showing a typical form of a slit electrode (comb-shaped electrode) when a pixel is divided into four regions. The slit electrode has comb-shaped slits arranged in four directions from a center of a pixel, and thus with no voltage applied, the liquid crystal molecules are aligned substantially vertically to the substrates in a pixel, while with a voltage applied, the liquid crystal molecular directors are directed in four different directions and come close to horizontal alignment. As a result, the alignment direction of liquid crystal in a pixel can be divided into plural directions, thereby causing a very wide viewing angle characteristic.

Other than the method of providing slits in the pixel electrode, a method of providing a linear projection or the like in a pixel, a method of providing an electrode other than the pixel electrode and the common electrode, and the like can be used as a method for diving a pixel. The alignment direction of liquid crystal molecules can be divided by any one of these methods, but a configuration using a slit electrode is preferred in view of transmittance and the ease of manufacture. A pixel electrode provided with slits has no driving force to liquid crystal molecules with no voltage applied, and thus a pre-tilt angle cannot be given to liquid crystal molecules. However, a pre-tilt angle can be given by using an alignment film material used in the present invention, and a wide viewing angle can be achieved by pixel division performed by combination with a slit electrode for dividing a pixel.

In the present invention, "having a pre-tilt angle" presents a state in which with no voltage applied, the liquid crystal molecular directors are slightly different from a direction vertical to a substrate surface (a surface of each of the first substrate 11 and the second substrate 12 on the side adjacent to the liquid crystal composition layer 13).

The liquid crystal display device of the present invention is a vertical alignment (VA)-mode liquid crystal display device, and thus, with no voltage applied, the liquid crystal molecular directors are aligned substantially vertically to the substrate surface. In order to vertically align liquid crystal molecules, a vertical alignment film is generally used. Examples of a material used for forming the vertical alignment film include polyimide, polyamide, polysiloxane, and the like, and among these, polyimide is preferred.

The vertical alignment film material may contain a mesogenic moiety, but, unlike a polymerizable compound described below, the vertical alignment film material preferably does not contain a mesogenic moiety. When the vertical alignment film material contains a mesogenic moiety, repeated application of a voltage may cause image sticking or the like due to disturbance in a molecular arrangement.

When the vertical alignment film is composed of polyimide, it is preferred to use a polyimide solution prepared by dissolving or dispersing a mixture of tetracarboxylic dianhydride and diisocyanate, polyamic acid, and polyimide in a solvent. In this case, the polyimide content in the polyimide solution is preferably 1% by mass or more ad 10% by mass or less, more preferably 3% by mass or more and 5% by mass or less, and further preferably 10% by mass or less.

On the other hand, a polysiloxane-based vertical alignment film is used, a polysiloxane solution prepared by dissolving polysiloxane can be used, the polysiloxane being produced by mixing an alkoxy group-containing silicon compound, an alcohol derivative, and an oxalic acid derivative at a predetermined mixing ratio and then heating the resultant mixture.

The liquid crystal display device of the present invention contains a polymer which regulates the alignment direction apart from the vertical alignment film made of polyimide or the like. The polymer imparts the function of fixing the pre-tilt angle of liquid crystal molecules.

With a voltage applied, the liquid crystal molecular directors in a pixel can be tilted in different directions by using a slit electrode or the like. However, even in a configuration using the slit electrode, with no voltage applied, liquid crystal molecules are aligned substantially vertically to the substrate surface, and thus a pre-tilt angle is not produced. With a voltage applied, the tilt direction of liquid crystal molecules can be controlled by giving a proper pre-tilt angle using the polymer.

In the liquid crystal display device of the present invention, a mixture of a liquid crystal composition and a polymerizable compound is sealed between the electrode substrates each having the vertical alignment film which controls alignment substantially vertically, and in a state where the liquid crystal molecules are slightly tilted by applying a voltage between the electrodes, the reactive compound in the mixture is polymerized to form a polymer by irradiation with energy rays such as ultraviolet light or the like, thereby giving a proper pre-tilt angle.

The polymer has a number-average molecular weight of 50,000 or more in terms of polystyrene, and thus in a process of polymerizing the polymerizable compound, a polymer layer can be formed by sufficient phase separation of the polymer from the mixture with the liquid crystal composition and adhesion to the substrate having the vertical alignment film. The polymer layer can give a direction in which liquid crystal molecules are tilted when a voltage is applied, and at the same time, a good pre-tilt angle and a uniform substrate over the entire thereof can be obtained. When the polymer has small number-average molecular weight, the result liquid crystal display device has substantially no or unsatisfactory pre-tilt angle.

The number-average molecular weight of the polymer can be measured by using GPC (gel permeation chromatography). The polymer layer adhering to the substrate having the vertical alignment film and the polymer present in the liquid crystal composition are dissolved in a solvent and subjected to GPC measurement. The molecular weight of the polymer can be determined comparing the retention time of a polymer peak obtained in GPC measurement to a molecular weight calibration curve formed by using standards having known molecular weights. In general, polystyrenes are widely used as the standards having known molecular weights. The molecular weight in terms of polystyrene can be determined by comparing the retention time of a peak to the molecular weight calibration curve formed by using polystyrenes as the standards. A polymer peak obtained by GPC measurement is generally broad. This is because a polymer has a molecular weight distribution, not a single molecular weight. The molecular weight of a polymer having a molecular weight distribution is generally expressed by an average molecular weight. There are various definitions of the average molecular weight, such as number-average molecular weight, weight-average molecular weight, viscosity-average molecular weight, and the like, and the number-average molecular weight is used in the present invention. The liquid crystal display device having a good pre-tilt angle can be produced by using the polymer having a number-average molecular weight of 50,000 or more in terms of polystyrene. The conceivable reason for this is that when the polymer has a number-average molecular weight of 50,000 or more in terms of polystyrene, phase separation of the polymer from the liquid crystal composition smoothly proceeds, and the polymer layer having an alignment regulating ability is formed by the polymer adhering to the substrate having the vertical alignment film. The process of phase separation of the polymer from the liquid crystal composition is strongly affected by the solubility of the polymer in the liquid crystal composition. In addition, a low-molecular-weight component in the polymer greatly contributes to the solubility in the liquid crystal composition. That is, the smaller the amount of a low-molecular-weight component, the more active the phase separation of the polymer becomes. Therefore, among the average molecular weights, the number-average molecular weight which is easily affected by a low-molecular-weight component is considered to reflect well a phase separation state. The definition of the number-average molecular weight is represented by equation (1) below.

[Math. 1]

$$Mn = \frac{\sum MiNi}{\sum Ni} \quad (1)$$

(wherein Mn=number-average molecular weight, Mi=molecular weight i, and Ni=number of molecules having molecular weight Mi).

The polymer having a number-average molecular weight of 50,000 or more in terms of polystyrene is preferred because it contains a small amount of low-molecular-weight component, resulting in a liquid crystal display device having a good pre-tilt angle. The number-average molecular weight is more preferably 70,000 or more because of a smaller amount of low-molecular-weight component. On the other hand, when the polymer has a number-average molecular weight exceeding 10,000,000 in terms of polystyrene, uniformity of the polymer layer may be degraded, and thus the number-average molecular weight is preferably 10,000,000 or less. The degree of uniformity of the polymer layer is also affected by the vertical alignment film and liquid crystal composition used. The number-average molecular weight of the polymer in terms of polystyrene is more preferably a value of 4,000,000 or less at which uniformity of the polymer can be maintained by absorbing the external factors.

In the present invention, "substantially vertically" represents a state in which the directors of vertically aligned liquid crystal molecules are given a pre-tilt angle and slightly fall from the vertical direction. When the pre-tilt angles in completely vertical alignment and homogeneous alignment (horizontal alignment to the substrate surface) are 90° and 0°, respectively, the pre-tilt angle in substantially vertical alignment is preferably 89° to 86° and more preferably 89° to 87°.

(Polymerizable Compound)

Since the polymer formed in the liquid crystal display device of the present invention has a number-average molecular weight of 50,000 or more in terms of polystyrene, the polymerizable compound which forms the polymer preferably has a difunctional or tri- or more functional reactive group.

The reactive group in the polymerizable compound is preferably a substituent having optical polymerizability.

Specifically, the polymerizable compound is preferably a compound represented by general formula (II) below.

[Chem. 1]

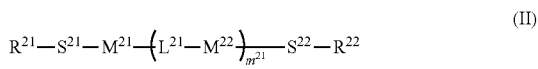

(In the formula, $R^{21}$ and $R^{22}$ each independently represent any one of formula (R-1) to formula (R-15) below,

[Chem. 2]

(R-1)

(R-2)

(R-3)

(R-4)

(R-5)

(R-6)

(R-7)

-continued

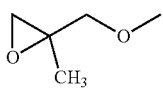
(R-8)

(R-9)

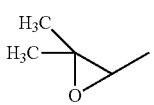
(R-10)

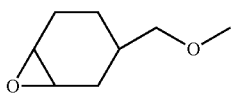
(R-11)

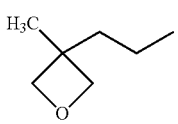
(R-12)

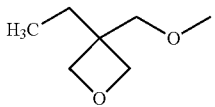
(R-13)

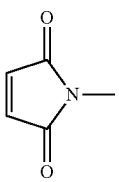
(R-14)

HS—
(R-15)

$S^{21}$ and $S^{22}$ each independently represent an alkyl group having 1 to 12 carbon atoms or a single bond, a methylene group in the alkyl group may be substituted by an oxygen atom, —COO—, —OCO—, or —OCOO— so that oxygen atoms are not directly bonded to each other, $L^{21}$ represents a single bond, —O—, —CH$_2$—, —OCH$_2$—, —CH$_2$O—, —CO—, —C$_2$H$_4$—, —COO—, —OCO—, —CH=CH—COO—, —COO—CH=CH—, —OCO—CH=CH—, —CH=CH—OCO—, —COOC$_2$H$_4$—, —OCOC$_2$H$_4$—, —C$_2$H$_4$OCO—, —C$_2$H$_4$COO—, —OCOCH$_2$—, —CH$_2$COO—, —CH=CH—, —CF=CH—, —CH=CF—, —CF=CF—, —CF$_2$—, —CF$_2$O—, —OCF$_2$—, —CF$_2$CH$_2$—, —CH$_2$CF$_2$—, —CF$_2$CF$_2$—, or —C≡C—, when a plurality of $L^{21}$ are present, they may be the same or different, $M^{21}$ represents a 1,4-phenylene group, a naphthalene-2,6-diyl group, an anthracene-2,6-diyl group, or a phenathrene-2,7-diyl group, which may be unsubstituted or in which a hydrogen containing the group may be substituted by a fluorine atom, a chlorine atom, an alkyl group having 1 to 8 carbon atoms, a halogenated alkyl group, a halogenated alkoxy group, an alkoxy group, a nitro group, or $$—S^{21}—R^{21}$$ [Chem. 3]

$M^{22}$ represents a 1,4-phenylene group, a 1,4-cyclohexylene group, a naphthalene-2,6-diyl group, an anthracene-2,6-diyl group, or a phenathrene-2,7-diyl group, which may be unsubstituted or in which a hydrogen containing the group may be substituted by a fluorine atom, a chlorine atom, an alkyl group having 1 to 8 carbon atoms, a halogenated alkyl group, a halogenated alkoxy group, an alkoxy group, a nitro group, or $$—S^{21}—R^{21}$$ [Chem. 4]

when a plurality of $M^{22}$ are present, they may be the same or different, and $m^{21}$ is 0, 1, 2, or 3).

In the formula, $R^{21}$ and $R^{22}$ are each preferably the formula (R-1) or the formula (R-2), $L^{21}$ is preferably a single bond, —O—, —OCH$_2$—, —CH$_2$O—, —C$_2$H$_4$—, —COO—, —OCO—, —COO—CH=CH—, —CH=CH—OCO—, —OCOC$_2$H$_4$—, —C$_2$H$_4$OCO—, —OCOCH$_2$—, or —CH$_2$COO—, $M^{21}$ and $M^{22}$ are each preferably a 1,4-phenylene group, which is unsubstituted or has a fluorine atom or an alkyl group having 1 to 8 carbon atoms, and $m^{21}$ represents 0, 1, 2, or 3 and is preferably 0, 1, or 2.

In further detail, specifically, the polymerizable compound represented by the general formula (II) is preferably a compound represented by general formula (II-1) below,

[Chem. 5]

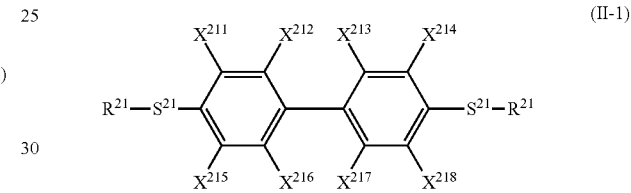
(II-1)

(in the formula, $R^{21}$ and $S^{21}$ each represent the same meaning as $R^{21}$ and $S^{21}$ in the general formula (II), and $X^{211}$ to $X^{218}$ each represent hydrogen or fluorine).

In the compound represented by the general formula (II), the structure of a biphenyl skeleton described above is preferably formula (IV-11) to formula (IV-14), and the formula (IV-14) is preferred.

[Chem. 6]

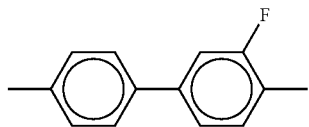
(IV-11)

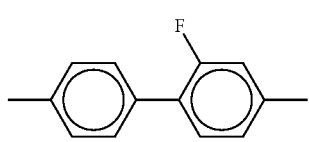
(IV-12)

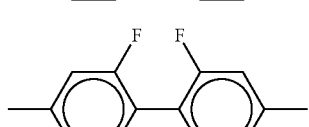
(IV-13)

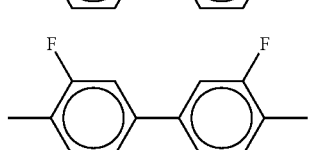
(IV-14)

The polymerizable compound having a skeleton represented by the formula (IV-11) to the formula (IV-14) has optimum alignment regulating force after polymerization, thereby providing a good alignment state.

Also, the compound represented by the general formula (II) may be a compound represented by general formula (II-2),

[Chem. 7]

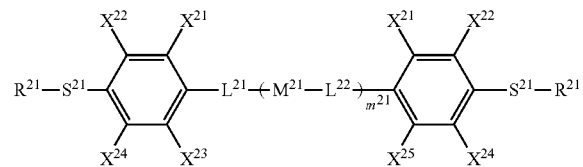

(II-2)

(in the formula, $R^{21}$, $S^{21}$, $L^{21}$, and $M^{21}$ each represent the same meaning as $R^{21}$, $S^{21}$, $L^{21}$, and $M^{21}$ in the general formula (II), $L^{22}$ represents the same meaning as $L^{21}$, and $X^{21}$ to $X^{25}$ each represent hydrogen or fluorine).

The liquid crystal composition contains 1 or 2 or more polymerizable compounds, preferably contains 1 to 5 polymerizable compounds, and more preferably contains 1 to 3 polymerizable compounds. With the polymerizable compound at a low content, the alignment regulating force to the liquid crystal composition is weakened. Conversely, with the polymerizable compound at an excessively high content, the energy required for polymerization is increased, and thus the amount of the polymerizable compound remaining unpolymerized is increased, thereby causing display defects. Therefore, the content is preferably 0.01% to 2.00% by mass, more preferably 0.05% to 1.00% by mass, and particularly preferably 0.10% to 0.50% by mass.

In the present invention, polymerization of the polymerizable compound proceeds even in the absence of a polymerization initiator, but the polymerization initiator may be added for accelerating polymerization. Examples of the polymerization initiator include benzoin ethers, benzophenones, acetophenones, benzylketals, acylphosphine oxides, and the like. Also, a stabilizer may be added for improving storage stability. Examples of the stabilizer which can be used include hydroquinones, hydroquinone monoalkyl ethers, tertiary butyl catechols, pyrogallols, thiophenols, nitro compounds, β-naphthyl amines, β-naphthols, nitroso compounds, and the like.

(Liquid Crystal Composition)

The liquid crystal composition used in the liquid crystal display device of the present invention contains a compound having negative dielectric anisotropy (Δ∈). Specifically, compounds represented by general formula (Ia), general formula (Ib), and general formula (Ic)

[Chem. 8]

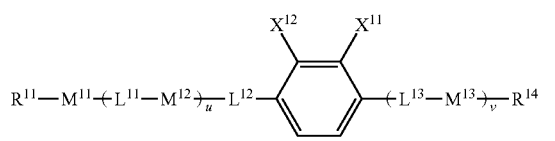

(Ia)

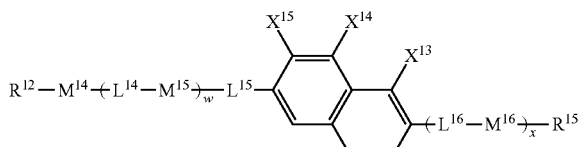

(Ib)

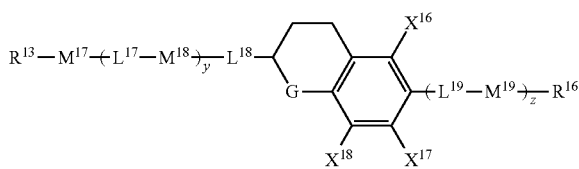

(Ic)

can be used as the compound having negative dielectric anisotropy (Δ∈).

In the formulae, $R^{11}$, $R^{12}$, $R^{13}$, $R^{14}$, $R^{15}$, and $R^{16}$ each independently represent an alkyl group having 1 to 10 carbon atoms or an alkenyl group having 2 to 10 carbon atoms, one or two or more unadjacent methylene groups present in the group may be substituted by —O— or —S—, one or two or more hydrogen atoms present in the group may be substituted by a fluorine atom or chlorine atom, $R^{11}$, $R^{12}$, and $R^{13}$ are each preferably an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, more preferably an alkyl group having 1 to 5 carbon atoms or an alkenyl group having 2 to 5 carbon atoms, and further preferably an alkyl group having 1 to 3 carbon atoms or an alkenyl group having 3 carbon atoms, and $R^{14}$, $R^{15}$, and $R^{16}$ are each preferably an alkyl group having 1 to 5 carbon atoms, an alkoxy group having 1 to 5 carbon atoms, or an alkenyloxy group, and more preferably an alkyl group having 1 to 2 carbon atoms or an alkoxy group having 1 to 2 carbon atoms.

When $R^{11}$, $R^{12}$, $R^{13}$, $R^{14}$, $R^{15}$, and $R^{16}$ each independently represent an alkenyl group, structures below are preferred.

[Chem. 9]

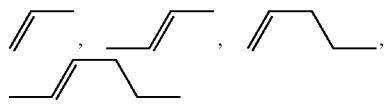

(In the formulae, the right end is bonded to a ring structure.)

In the structures described above, a vinyl group or 1-propenyl group which is an alkenyl group having 2 or 3 carbon atoms is more preferred.

In the formulae described above, u, v, w, x, y, and z each independently represent 0, 1, or 2, and u+v, w+x, and y+z are 2 or less.

$M^{11}$, $M^{12}$, $M^{13}$, $M^{14}$, $M^{15}$, $M^{16}$, $M^{17}$, $M^{18}$, and $M^{19}$ each independently represent a group selected from the group consisting of (a) a trans-1,4-cyclohexylene group (one methylene group or two or more unadjacent methylene groups present in the group may be substituted by —O— or —S—);

(b) a 1,4-phenylene group (one —CH= or unadjacent two or more —CH= present in the group may be substituted by a nitrogen atom); and (c) a 1,4-cyclohexenylene group, a 1,4-bicyclo(2.2.2) octylene group, a piperizine-2,5-diyl group, a naphthalene- 2,6-diyl group, a 1,2,3,4-tetrahydronaphthalene-2,6-diyl group, and a decahydronaphthalene-2,6-diyl group, hydrogen atoms contained in the group (a), the group (b), or the group (c) may be each substituted by a cyano group, a fluorine atom, a trifluoromethyl group, a trifluoromethoxy group, or a chlorine atom; when a plurality of each of $M^{12}$, $M^{13}$, $M^{15}$, $M^{16}$, $M^{18}$, and $M^{19}$ are present, these may be the same or different and are preferably each independently a trans-1,4-cyclohexylene group or a 1,4-phenylene group.

$L^{11}$, $L^{12}$, $L^{13}$, $L^{14}$, $L^{15}$, $L^{16}$, $L^{17}$, $L^{18}$, and $L^{19}$ each independently represent a single bond, —COO—, —OCO—, —CH$_2$CH$_2$—, —(CH$_2$)$_4$—, —OCH$_2$—, —CH$_2$O—, —OCF$_2$—, —CF$_2$O—, or —C≡C—; and when a plurality of each of $L^{11}$, $L^{13}$, $L^{14}$, $L^{16}$, $L^{17}$, and $L^{18}$ are present, these may be the same or different, and $L^{12}$, $L^{15}$, and $L^{18}$ are preferably each independently —CH$_2$CH$_2$—, —(CH$_2$)$_4$—, —CH$_2$O—, or —CF$_2$O— and more preferably —CH$_2$CH$_2$— or —CH$_2$O—. $L^{11}$, $L^{13}$, $L^{14}$, $L^{16}$, $L^{17}$, and $L^{18}$ are preferably each independently a single bond, —CH$_2$CH$_2$—, —OCH$_2$—, —CH$_2$O—, —OCF$_2$—, or —CF$_2$O—, and more preferably a single bond.

$X^{11}$ and $X^{12}$ each independently represent a trifluoromethyl group, a trifluoromethoxy group, or a fluorine atom and are each preferably a fluorine atom. $X^{13}$, $X^{14}$, and $X^{15}$ each independently represent a hydrogen atom, a trifluoromethyl group, a trifluoromethoxy group, or a fluorine atom, any one of $X^{13}$, $X^{14}$, and $X^{15}$ represents a fluorine atom, and all of $X^{13}$, $X^{14}$, and $X^{15}$ are preferably fluorine atoms. $X^{16}$, $X^{17}$, and $X^{18}$ each independently represent a hydrogen atom, a trifluoromethyl group, a trifluoromethoxy group, or a fluorine atom, any one of $X^{16}$, $X^{17}$, and $X^{18}$ represents a fluorine atom, $X^{16}$ and $X^{17}$ do not simultaneously represent fluorine atoms, $X^{16}$ and $X^{18}$ do not simultaneously represent fluorine atoms, $X^{16}$ is preferably a hydrogen atom, and $X^{17}$ and $X^{18}$ are each preferably a fluorine atom.

G represents a methylene group or —O— and is preferably —O—.

Among the compounds represented by the general formula (Ia), the general formula (Ib), and the general formula (Ic), the compound represented by the general formula (Ia) is particularly preferred.

The compound represented by the general formula (Ia) is preferably a compound selected from general formula (Ia-1) to general formula (Ia-12) below,

[Chem. 10]

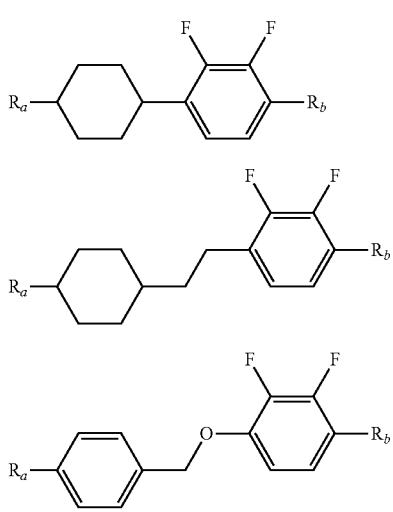

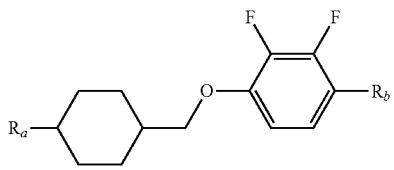

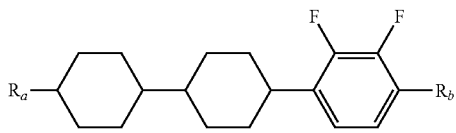

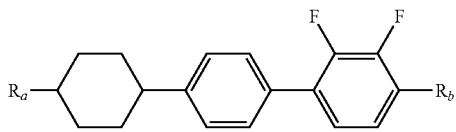

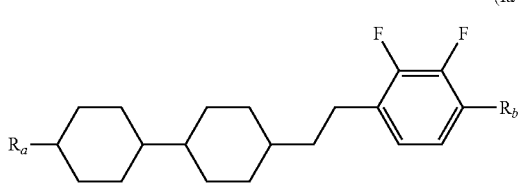

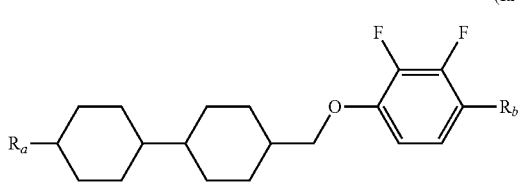

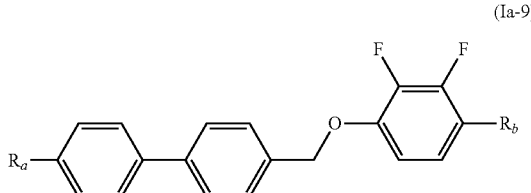

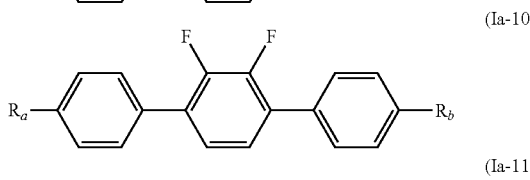

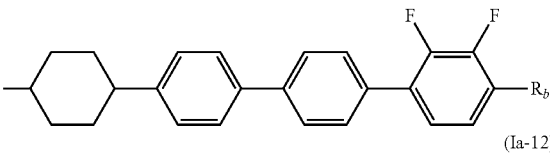

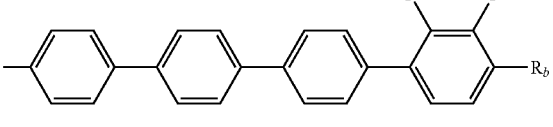

(in the formulae, $R_a$ and $R_b$ each independently represent an alkyl group having 1 to 7 carbon atoms, an alkoxy group, an alkenyl group having 2 to 6 carbon atoms, or an alkenyloxy group, a methylene group in the alkyl group, the alkenyl group, the alkoxy group, or the alkenyloxy group may be substituted by oxygen at least one position as long as oxygen atoms are not continuously bonded to each other, and a hydrogen atom in the alkyl group, the alkoxy group, the alkenyl group, or the alkenyloxy group may be substituted by a fluorine atom at least one position. $R_a$ is preferably an alkyl group having 1 to 5 carbon atoms, an alkoxy group, or an alkenyl group having 2 to 5 carbon atoms, and $R_b$ is preferably an alkyl group having 1 to 5 carbon atoms or an alkoxy group).

The content of a compound having negative dielectric anisotropy ($\Delta\in$) in the liquid crystal composition used in the liquid crystal display device of the resent invention is preferably 10% to 60% by mass and more preferably 15% to 50% by mass.

The liquid crystal composition used in the liquid crystal display device of the resent invention may further contain a compound having substantially zero dielectric anisotropy ($\Delta\in$). Specifically, a compound represented by general formula (IV)

[Chem. 11]

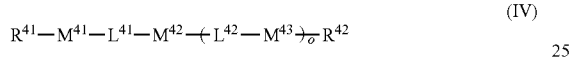

(IV)

is preferably contained.

In the formula, $R^{41}$ and $R^{42}$ each independently represent an alkyl group having 1 to 10 carbon atoms or an alkenyl group having 2 to 10 carbon atoms, one methylene group or two or more unadjacent methylene groups present in the group may be substituted by —O— or —S—, one or two or more hydrogen atoms present in the group may be substituted by a fluorine atom or chlorine atom, and $R^{41}$ and $R^{42}$ are each preferably an alkyl group having 1 to 5 carbon atoms, an alkoxy group, or an alkenyl group having 2 to 5 carbon atoms.

When $R^{41}$ and $R^{42}$ each independently represent an alkenyl group, structures below are preferred.

[Chem. 12]

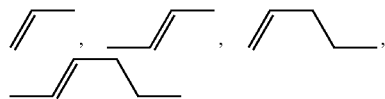

(In the formulae, the right end is bonded to a ring structure.)

In the structures described above, a vinyl group or 1-propenyl group which is an alkenyl group having 2 or 3 carbon atoms is more preferred.

In the formula, o represents 0, 1, or 2 and is preferably 0 or 1.

$M^{41}$, $M^{42}$, and $M^{43}$ each independently represent a group selected from the group consisting of (d) a trans-1,4-cyclohexylene group (one methylene group or two or more unadjacent methylene groups present in the group may be substituted by —O— or —S—);

(e) a 1,4-phenylene group (one —CH= or unadjacent two or more —CH= present in the group may be substituted by a nitrogen atom), a 3-fluoro-1,4-phenylene group, and a 3,5-difluoro-1,4-phenylene group; and (f) a 1,4-cyclohexenylene group, a 1,4-bicyclo(2.2.2)octylene group, a piperizine-2,5-diyl group, a naphthalene-2,6-diyl group, a decahydronaphthalene-2,6-diyl group, and a 1,2,3,4-tetrahydronaphthalene-2,6-diyl group; when a plurality of $M^{43}$ are present, they may be the same or different and are each preferably a trans-1,4-cyclohexylene group, a 1,4-phenylene group, or a 3-fluoro-1,4-phenylene group and more preferably a trans-1,4-cyclohexylene group or a 1,4-phenylene group.

$L^{41}$ and $L^{42}$ each independently represent a single bond, —CH$_2$CH$_2$—, —(CH$_2$)$_4$—, —OCH$_2$—, —CH$_2$O—, —OCF$_2$—, —CF$_2$O—, —CH=CH—, —CH=N—N=CH—, or —C≡C—; and when a plurality of $L^{42}$ are present, they may be the same or different and are each preferably a single bond, —CH$_2$CH$_2$—, —(CH$_2$)$_4$—, —OCH$_2$—, —CH$_2$O—, —OCF$_2$—, —CF$_2$O—, or —CH=CH—, more preferably a single bond or —CH$_2$CH$_2$—, and particularly preferably a single bond.

Preferred examples of the compound represented by the general formula (IV) include compounds represented by general formula (IV-1) to general formula (IV-6),

[Chem. 13]

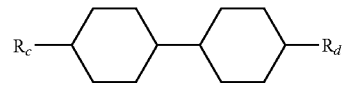

(IV-1)

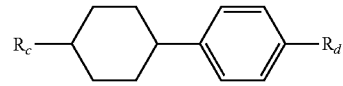

(IV-2)

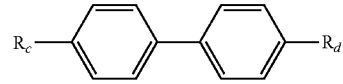

(IV-3)

(IV-4)

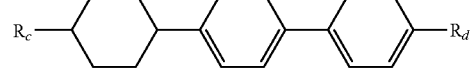

(IV-5)

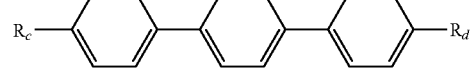

(IV-6)

(in the formulae, $R_c$ and $R_d$ each independently represent an alkyl group having 1 to 7 carbon atoms, an alkoxy group, an alkenyl group having 2 to 6 carbon atoms, or an alkenyloxy group, a methylene group in the alkyl group, the alkenyl group, the alkoxy group, or the alkenyloxy group may be substituted by oxygen at least one position as long as oxygen atoms are not continuously bonded to each other, and a hydrogen atom in the group may be substituted by a fluorine atom at least one position).

In addition, one or two or more compounds represented by general formula (VIII-a), general formula (VIII-c), or general formula (VIII-d) can be contained as the compound having substantially zero dielectric anisotropy ($\Delta\in$).

[Chem. 14]

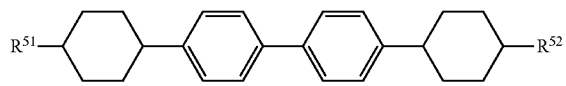

(VIII-a)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms.)

[Chem. 15]

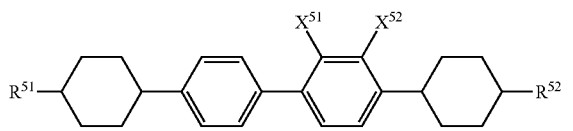

(VIII-c)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms, $X^{51}$ and $X^{52}$ each independently represent a fluorine atom or a hydrogen atom, at least one of $X^{51}$ and $X^{52}$ is a fluorine atom, and $X^{51}$ and $X^{52}$ are not both a fluorine atom.)

[Chem. 16]

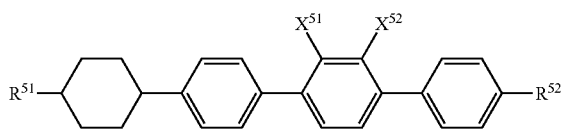

(VIII-d)

(In the formula, $R^{51}$ and $R^{52}$ each independently represent an alkyl group having 1 to 5 carbon atoms, an alkenyl group having 2 to 5 carbon atoms, or an alkoxy group having 1 to 4 carbon atoms, $X^{51}$ and $X^{52}$ each independently represent a fluorine atom or a hydrogen atom, at least one of $X^{51}$ and $X^{52}$ is a fluorine atom, and $X^{51}$ and $X^{52}$ are not simultaneously fluorine atoms.)

The content of the compound having substantially zero dielectric anisotropy ($\Delta\in$) in the liquid crystal composition used in the liquid crystal display device of the resent invention is preferably 10% to 80% by mass, more preferably 20% to 70% by mass, and further preferably 25% to 60% by mass.

The dielectric anisotropy ($\Delta\in$) at 25° C. of the liquid crystal composition of the present invention is −2.0 to −8.0, preferably −2.0 to −6.0, more preferably −2.0 to −5.0, and particularly preferably −2.5 to −4.0.

The refractive index anisotropy ($\Delta n$) at 20° C. of the liquid crystal composition of the present invention is 0.08 to 0.14, more preferably 0.09 to 0.13, and particularly preferably 0.09 to 0.12. In further detail, in correspondence with a thin cell gap, the refractive index anisotropy is preferably 0.10 to 0.13, and in correspondence with a thick cell gap, the refractive index anisotropy is preferably 0.08 to 0.10.

The viscosity ($\eta$) at 20° C. of the liquid crystal composition of the present invention is 10 to 30 mPa·s, more preferably 10 to 25 mPa·s, and particularly preferably 10 to 22 mPa·s.

The rotational viscosity ($\gamma_1$) at 20° C. of the liquid crystal composition of the present invention is 60 to 130 mPa·s, more preferably 60 to 110 mPa·s, and particularly preferably 60 to 100 mPa·s.

A ratio ($\gamma_1/K_{33}$) of rotational viscosity ($\gamma_1$) at 20° C. to elastic constant ($K_{33}$) of the liquid crystal composition of the present invention is 3.5 to 9.0 mPa·s·pN$^{-1}$, more preferably 3.5 to 8.0 mPa·s·pN$^{-1}$, and particularly preferably 3.5 to 7.0 mPa·s·pN$^{-1}$.

The liquid crystal composition of the present invention has a nematic-isotropic liquid phase transition temperature ($T_{ni}$) of 60° C. to 120° C., more preferably 70° C. to 100° C., and particularly preferably 70° C. to 85° C.

(Method for Manufacturing Liquid Crystal Display Device)

A method for manufacturing the liquid crystal display device of the present invention is described with reference to FIG. 1.

A vertical alignment material is applied to the surface of the first substrate 11 on which the common electrode 14 is formed and the surface of the second substrate 12 on which the pixel electrode 15 is formed and then heated to form the vertical alignment films 16 and 17.

When the vertical alignment material is polyimide, a polymer compound precursor is, for example, a polyimide solution prepared by dissolving or dispersing a mixture of tetracarboxylic dianhydride and diisocyanate, polyamic acid, and polyimide in a solvent. The content of polyimide in the polyimide solution is preferably 1% by mass or more and 10% by mass or less, and more preferably 3% by mass or more and 5% by mass or less.

When the vertical alignment material is polysiloxane, a polymer compound precursor is, for example, a polysiloxane solution prepared by synthesizing polysiloxane by mixing an alkoxy group-containing silicon compound, a halogenated alkoxy group-containing silicon compound, alcohol, and oxalic acid at a predetermined mixing ratio and then heating the resultant mixture, and then dissolving the polysiloxane in a solvent.

The vertical alignment material is applied or printed on each of the first substrate 11 and the second substrate 12 so as to cover the common electrode 14, the pixel electrode 15, and a slit portion (not shown), and then treated by heating or the like. As a result, the polymer compound precursor contained in the applied or printed alignment material is polymerized and cured to form a polymer compound, thereby forming the vertical alignment films 16 and 17. In the heat treatment, the temperature is preferably 80° C. or more and more preferably 150° C. to 200° C.

Next, the first substrate 11 and the second substrate 12 are combined, and the liquid crystal composition layer 13 containing the liquid crystal composition and the polymerizable compound is sealed between the substrates.

Specifically, in any one of the first substrate 11 and the second substrate 12, spacer projections, for example, plastic beads or the like, for securing a cell gap are dispersed on the surface on which the vertical alignment film 16 or 17 is formed, and a seal portion is printed by, for example, a screen printing method using an epoxy adhesive or the like.

Then, the first substrate 11 and the second substrate 12 are bonded together through the spacer projections and the seal portion so that the vertical alignment films 16 and 17 face each other, and the liquid crystal composition containing liquid crystal molecules is injected.

Then, the seal portion is cured by heating to seal the liquid crystal composition between the first substrate 11 and the second substrate 12.

Other than the above-described method of sealing the liquid crystal composition layer 13 containing the liquid crystal composition and the polymerizable compound between the first substrate 11 and the second substrate 12, the liquid crystal composition layer 13 can be injected by dropping the liquid crystal composition layer 13 containing the liquid crystal composition and the polymerizable compound on the first substrate 11 and then bonding the second substrate 12 in vacuum.

After the liquid crystal composition layer 13 containing the liquid crystal composition and the polymerizable compound is injected between the first substrate 11 and the second substrate 12 as described above, then a voltage is applied between the common electrode 14 and the pixel electrode 15 by using a voltage application unit. The voltage is applied with a magnitude of, for example, 5 to 30 (V). As a result, an electric field is produced in a direction at a predetermined angle with the surface (the surface facing the liquid crystal composition layer 13) adjacent to the liquid crystal composition layer 13 in the first substrate 11 and the surface (the surface facing the liquid crystal composition layer 13) adjacent to the liquid crystal composition layer 13 in the second substrate 12, and thus liquid crystal molecules 19 are aligned in a predetermined direction inclined from the normal direction to the first substrate 11 and the second substrate 12. In this case, the inclination angle of the liquid crystal molecules 19 is substantially equal to the pre-tilt angle $\theta$ given to the liquid crystal molecules 19 in a step described below. Therefore, the pre-tilt $\theta$ of the liquid crystal molecules 19 can be controlled by appropriately adjusting the magnitude of voltage (refer to FIG. 3).

Further, the polymerizable compound in the vertical alignment films 16 and 17 is polymerized by irradiating the liquid crystal composition layer 13 with energy rays, for example, from the outside of the first substrate 11 while the voltage is applied, thereby forming a second polymer compound. In this case, ultraviolet light is particularly preferred as the energy rays.

When ultraviolet light is used, a metal halide lamp, a high-pressure mercury lamp, a superhigh-pressure mercury lamp, or the like can be used a lamp which generates ultraviolet light. With respect to a wavelength of irradiating ultraviolet light, irradiation with ultraviolet light within a wavelength region which is not an absorption wavelength region of the liquid crystal composition is preferred, and if required, ultraviolet light is preferably partially cut off. The intensity of irradiating ultraviolet light may be constant or may not be constant, and when the intensity of irradiation is changed, the irradiation time at each intensity is an arbitrary value. When a two-or-more-state irradiation step is used, the irradiation intensity in the second or later stage in the irradiation step is preferably selected to be weaker than that in the first stage, and the total irradiation time and total irradiation energy in the second or later stage are longer and larger than those in the first stage. When the irradiation intensity is discontinuously changed, the average irradiation intensity in the first half of the total time of the irradiation step is preferably higher than that in the second half, the intensity immediately after the start of irradiation is more preferably highest, and the irradiation intensity is further preferably continuously decreased to a certain value with the passage of irradiation time. In this case, the intensity of ultraviolet light UV is preferably 2 mW/cm$^2$ to 100 W/cm$^2$. The irradiation intensity in the first stage of multi-stage irradiation or the maximum irradiation intensity in the entire irradiation step when the irradiation intensity is discontinuously changed is more preferably 10 mW/cm$^2$ to 100 W/cm$^2$. The irradiation intensity in the second or latter stage of multi-stage irradiation or the minimum irradiation intensity in the irradiation step when the irradiation intensity is discontinuously changed is more preferably 2 mW/cm$^2$ to 50 W/cm$^2$. The total amount of irradiation energy is preferably 10 J to 300 J, more preferably 50 J to 250 J, and further preferably 100 J to 250 J.

In this case, the applied voltage may be an alternating-current electric field or a direct-current voltage.

The temperature during irradiation is preferably within a temperature range in which the liquid crystal state of the liquid crystal composition of the present invention is maintained. Polymerization is preferably performed at a temperature close to room temperature, that is, typically a temperature of 15° C. to 35° C.

As a result, the polymerizable compound in the liquid crystal composition layer 13 containing the liquid crystal composition and the polymerizable compound is polymerized, and the resultant polymer is fixed to an alignment control portion of the vertical alignment films 16 and 17, thereby forming an alignment regulating portion (not shown). In a non-driving state, the alignment regulating portion has the function to apply the pre-tilt $\theta$ to the liquid crystal molecules 19 in the liquid crystal composition layer 13 at a position near the interface with each of the alignment films 16 and 17. Although, ultraviolet light is applied from the outside of the first substrate 11, ultraviolet light may be applied from the outside of the second substrate 12 or allied from the outsides of both the first substrate 11 and the second substrate 12.

As described above, in the liquid crystal display device of the present invention, the liquid crystal molecules 19 in the liquid crystal composition layer 13 have predetermined pre-tilt $\theta$. Therefore, the liquid crystal display device is characterized by being significantly improved in response speed to a drive voltage as compared with a liquid crystal display device not subjected to pre-tilt treatment and a liquid crystal display apparatus provided with the device.

The liquid crystal display device of the present invention is particularly useful for liquid crystal display devices for active matrix drive.

EXAMPLES

The present invention is described in further detail below by giving examples, but the present invention is not limited to these examples. In addition, in compositions described in the examples below, "%" represents "% by mass".

First produced were a first substrate (common electrode substrate) provided with a transparent electrode layer including a transparent common electrode and a color filter layer and a second substrate (pixel electrode substrate) provided with a pixel electrode layer including a transparent pixel electrode driven by an active element. The pixel electrode in the pixel electrode substrate was formed by etching ITO so that slits without the pixel electrode were present in order to divide alignment of liquid crystal molecules.

A vertical alignment film composed of polyimide was formed on each of the common electrode substrate and the pixel electrode substrate. JALS2096 manufactured by JSR Corporation was used as a vertical alignment film forming material. A polymerizable liquid crystal composition containing a polymerizable compound was held between the common electrode substrate and the pixel electrode substrate each having the vertical alignment film formed thereon, and then a polymerizable liquid crystal composition layer was formed by curing a sealing agent. In this case, the thickness of the polymerizable liquid crystal composition layer was adjusted to 3 µm by using spacers having a thickness of 3 µm.

After the completion of the step described above, the polymerizable compound in the polymerizable liquid crystal composition layer was polymerized by ultraviolet irradiation in a state where a rectangular alternating-current electric field of 7 V was applied between the common electrode and the pixel electrodes, thereby producing a liquid crystal display device. UIS-S2511RZ manufactured by Ushio Inc. was used as an irradiation apparatus, and USH-250BY manufactured by Ushio Inc. was used as an ultraviolet lamp. In this step, a pre-tilt angle was given to liquid crystal molecules in the liquid crystal display device.

Figure 3:
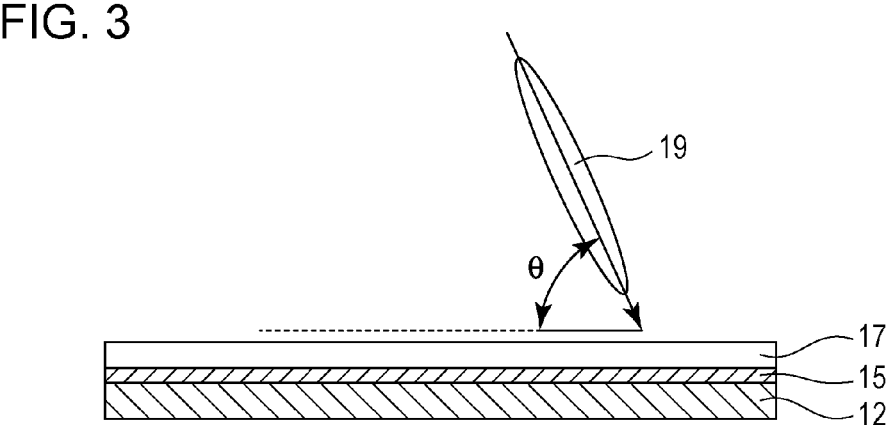
FIG. 3 is a drawing showing the definition of a pre-tilt angle in a liquid crystal display device of the present invention.

The pre-tilt angle is defined as shown in FIG. 3. The pre-tilt angle (θ) in the case of completely vertical alignment is 90°, and when the pre-tilt angle is given, the pre-tilt angle (θ) is smaller than 90°. In the present invention, the pre-tilt angle of the liquid crystal display device was measured by a crystal rotation method using TBA-105 manufactured by Autronic Inc.

After the pre-tilt angle was measured, the molecular weight of the polymer produced by polymerizing the polymerizable compound contained in the liquid crystal composition was measured. A measuring method is described below. First, the common electrode substrate and the pixel electrode substrate were separated to obtain a strip-shaped small piece. The piece, together with the liquid crystal composition adhering to the surfaces thereof, was immersed in tetrahydrofuran for high-performance liquid chromatography manufactured by Wako Pure Chemical Industries, Ltd. and violently shaken for 10 minutes by using a shaker. The substrate fragments etc. in tetrahydrofuran were removed by filtration, and then the polystyrene-converted molecular weight of the polymer eluted in tetrahydrofuran was measured by using GPC (GPC-8020 manufactured by Tosoh Corporation).

Also, in the present invention, the appearance of the polymerizable compound polymer formed on the vertical alignment film was observed with a scanning electron microscope. An observation method is described below. The common electrode substrate and the pixel electrode substrate of the produced liquid crystal display device were separated, and the device was cut into a size which can be placed on a sample stage of the scanning electron microscope. The liquid crystal composition adhering the device cut piece was removed by quietly flowing acetone on surfaces of the device cut piece. The surface of the device cut piece was coated with platinum by using a sputtering apparatus to impart conductivity. The resultant sample was observed by using a scanning electron microscope (JSM6010-LA manufactured by JEOL Ltd.) under the conditions of an acceleration voltage of 15 kV and a magnification of 10,000 times.

In the present invention, measurement of the amount of the polymerizable compound remaining in the liquid crystal display device confirmed that the amount of the unpolymerized polymerizable compound remaining in the produced liquid crystal display device is less than the detection limit. A method for measuring the amount of the polymerizable compound remaining is described. First, the liquid crystal display device was disassembled, and an acetonitrile solution of eluted components including the liquid crystal composition, the polymer, and the unpolymerized polymerizable compound was prepared. The acetonitrile solution was analyzed by high-performance chromatography (ACQUITY UPLC manufactured by Waters Corporation), and a peak area of each of the components was measured. The amount of the polymerizable compound remaining was determined from a ratio of the peak area of the unpolymerized polymerizable compound to the peak area of a liquid crystal compound used as an index. The amount of the polymerizable compound remaining was determined from the ratio and the amount of the polymerizable compound initially added. The detection limit of the amount of the polymerizable compound remaining was 100 ppm.

In the examples, compounds are described by using abbreviations below.

(Side Chain)
-n —$C_nH_{2n+1}$ linear alkyl group having n carbon atoms
n- $C_nH_{2n+1}$— linear alkyl group having n carbon atoms
—On —$OC_nH_{2n+1}$ linear alkoxy group having n carbon atoms
nO— $C_nH_{2n+1}O$— linear alkoxy group having n carbon atoms
—V —CH=$CH_2$
V— $CH_2$=CH—
—V1 —CH=CH—$CH_3$
1V— $CH_3$—CH=CH—
-2V —$CH_2$—$CH_2$—CH=$CH_3$
V2- $CH_3$=CH—$CH_2$—$CH_2$—

(Ring Structure)

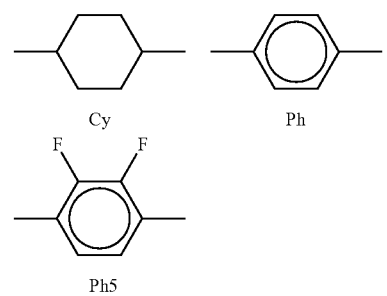

[Chem. 17]

Cy    Ph

Ph5

The characteristics measured in the examples are as follows.

$T_{ni}$: nematic-isotropic liquid phase transition temperature (° C.)
Δn: refractive index anisotropy at 20° C.
Δε: dielectric anisotropy at 20° C.
$γ_1$: rotational viscosity at 20° C. (mPa·s)
$K_{33}$: elastic constant $K_{33}$ at 20° C. (pN)

Liquid crystal compositions LC-1 to LC-5 were prepared, and the physical property values thereof were measured. The compositions of the liquid crystal compositions and the results of the physical property values are as shown in Table 1.

TABLE 1

|  | LC-1 | LC-2 |
|---|---|---|
| 5-Ph-Ph-1 | 10 |  |
| 5-Ph-Ph-O1 | 6 |  |
| 3-Cy-Cy-V |  | 41 |
| 3-Cy-Cy-V1 |  | 2 |
| 3-Cy-Cy-2 | 15 |  |
| 3-Cy-Cy-4 | 8 |  |
| 3-Cy-Cy-5 | 4 |  |
| 3-Cy-Cy-Ph-1 | 7 |  |
| 3-Cy-Cy-Ph-3 | 4 |  |
| 3-Cy-1O-Ph5-O1 | 6 |  |
| 3-Cy-1O-Ph5-O2 | 7 | 5 |
| 2-Cy-Cy-1O-Ph5-O2 | 7 |  |
| 3-Cy-Cy-1O-Ph5-O2 | 6 | 3 |
| 4-Cy-Cy-1O-Ph5-O2 | 2 | 3 |
| V-Cy-Cy-1O-Ph5-O2 |  | 9 |

TABLE 1-continued

|  | LC-1 | LC-2 |
|---|---|---|
| 3-Cy-Ph-Ph5-O3 | 6 | 3 |
| 3-Cy-Ph-Ph5-O4 | 6 | 3 |
| 4-Cy-Ph-Ph5-O3 | 4 | 3 |
| 5-Cy-Ph-Ph5-O3 | 2 |  |
| 1V-Cy-1O-Ph5-O2 |  | 10 |
| V2-Ph-Ph5-Ph-2V |  | 11 |
| V2-Ph-Ph5-Ph-2 |  | 7 |
| Total [%] | 100 | 100 |
| Tni [° C.] | 76.0 | 75.3 |
| Δn | 0.102 | 0.109 |
| Δε | −2.9 | −3.1 |
| $\gamma_1$ [mPa · s] | 122 | 83 |
| $K_{33}$ [pN] | 13.0 | 14.8 |
| $\gamma_1/K_{33}$ [mPa · s · pN$^{-1}$] | 9.4 | 5.6 |

Example 1

To 100% of the liquid crystal composition LC-1, 0.4% of polymerizable compound A represented by

[Chem. 18]

Figure 4:
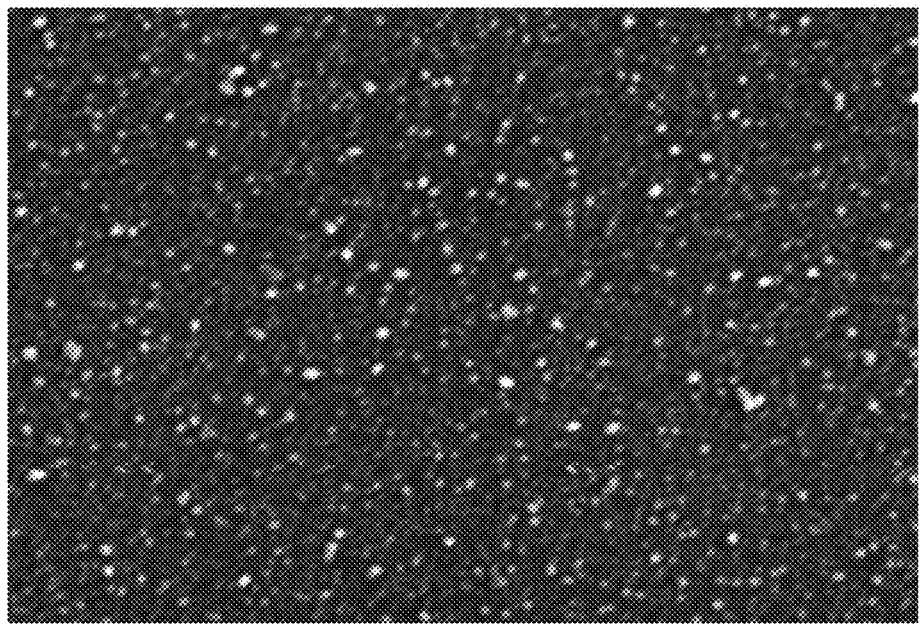
FIG. 4 is a scanning electron micrograph of a vertical alignment film of a liquid crystal display device shown in Example 1.

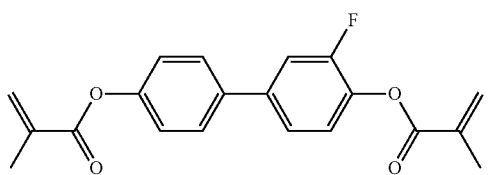

was added and uniformly dissolved to prepare polymerizable liquid crystal composition CLC-1. A liquid crystal display device was produced by using CLC-1 according to the method described above. However, in the step of irradiating the device with ultraviolet light in a state in which a rectangular alternating-current electric field of 7 V was applied between the common electrode and the pixel electrodes, an intensity of irradiation measured at a center wavelength of 365 nm by using an accumulated UV meter UIT-150 manufactured by Ushio Inc. was adjusted to 100 mW/cm², and ultraviolet light in an accumulated light quantity of 100 J/cm² was applied over 1,000 seconds. The pre-tilt angle of the liquid crystal display device measured before the ultraviolet irradiation step was 87.9°, and the pre-tilt angle of the liquid crystal display device measured after the ultraviolet irradiation step was 81.3°. The polymer produced by ultraviolet irradiation had a number-average molecular weight of 75,000 in terms of polystyrene. FIG. 4 shows the result of scanning electron microscope observation of the vertical alignment film of the liquid crystal display device of Example 1. A state was observed, in which innumerable polymer fine particles produced by polymerizing the polymerizable compound adhere to the vertical alignment film.

Example 2

To 100% of the liquid crystal composition LC-2, 0.4% of polymerizable compound A represented by

[Chem. 19]

Figure 5:
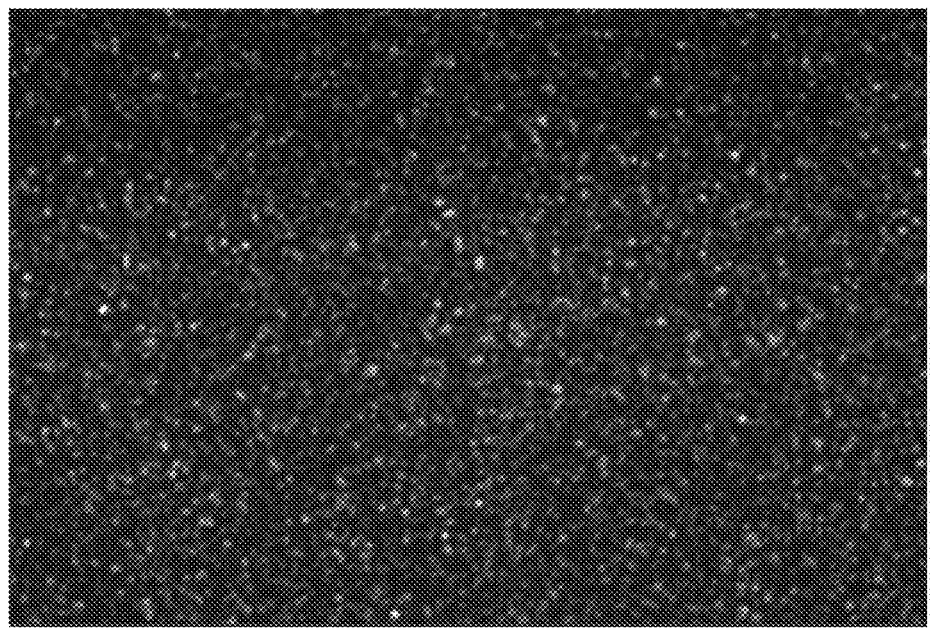
FIG. 5 is a scanning electron micrograph of a vertical alignment film of a liquid crystal display device shown in Example 2.

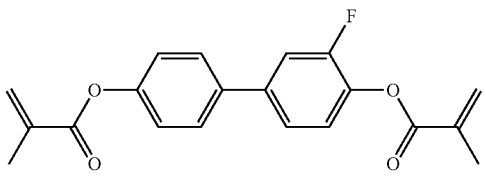

was added and uniformly dissolved to prepare polymerizable liquid crystal composition CLC-2. A liquid crystal display device was produced by using CLC-2 according to the method described above. However, in the step of irradiating the device with ultraviolet light in a state in which a rectangular alternating-current electric field of 7 V was applied between the common electrode and the pixel electrodes, an intensity of irradiation measured at a center wavelength of 365 nm by using an accumulated UV meter UIT-150 manufactured by Ushio Inc. was adjusted to 20 mW/cm², and ultraviolet light in an accumulated light quantity of 100 J/cm² was applied over 5000 seconds. The pre-tilt angle of the liquid crystal display device measured before the ultraviolet irradiation step was 87.3°, and the pre-tilt angle of the liquid crystal display device measured after the ultraviolet irradiation step was 85.2°. The polymer produced by ultraviolet irradiation had a number-average molecular weight of 495,000 in terms of polystyrene. FIG. 5 shows the result of scanning electron microscope observation of the vertical alignment film of the liquid crystal display device of Example 2. A state was observed, in which innumerable polymer fine particles produced by polymerizing the polymerizable compound adhere to the vertical alignment film.

Example 3

To 100% of the liquid crystal composition LC-2, 0.4% of polymerizable compound B represented by

[Chem. 20]

Figure 6:
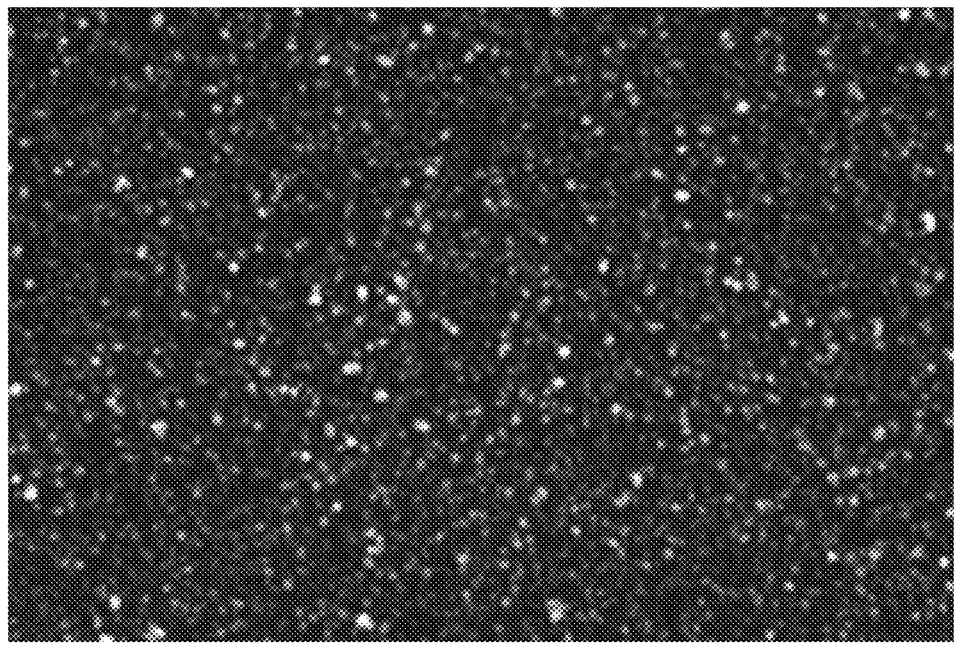
FIG. 6 is a scanning electron micrograph of a vertical alignment film of a liquid crystal display device shown in Example 3.

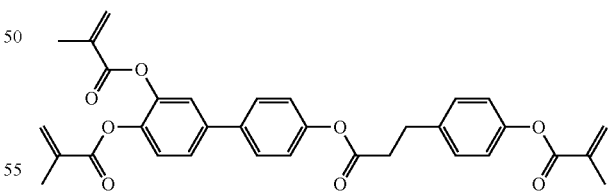

was added and uniformly dissolved to prepare polymerizable liquid crystal composition CLC-3. A liquid crystal display device was produced by using CLC-1 according to the method described above. However, in the step of irradiating the device with ultraviolet light in a state in which a rectangular alternating-current electric field of 7 V was applied between the common electrode and the pixel electrodes, an intensity of irradiation measured at a center wavelength of 365 nm by using an accumulated UV meter UIT-150 manufactured by Ushio Inc. was adjusted to 100 mW/cm², and ultraviolet light in an accumulated light quantity of 100 J/cm² was applied over 1000 seconds. The pre-tilt angle of the liquid crystal display device measured before the ultraviolet irradiation step was 87.1°, and the pre-tilt angle of the liquid crystal display device measured after the ultraviolet irradiation step was 85.4°. The polymer produced by ultraviolet irradiation had a number-average molecular weight of 608,000 in terms of polystyrene. FIG. 6 shows the result of scanning electron microscope observation of the vertical alignment film of the liquid crystal display device of Example 3. A state was observed, in which innumerable polymer fine particles produced by polymerizing the polymerizable compound adhere to the vertical alignment film.

Comparative Example 1

Figure 7:
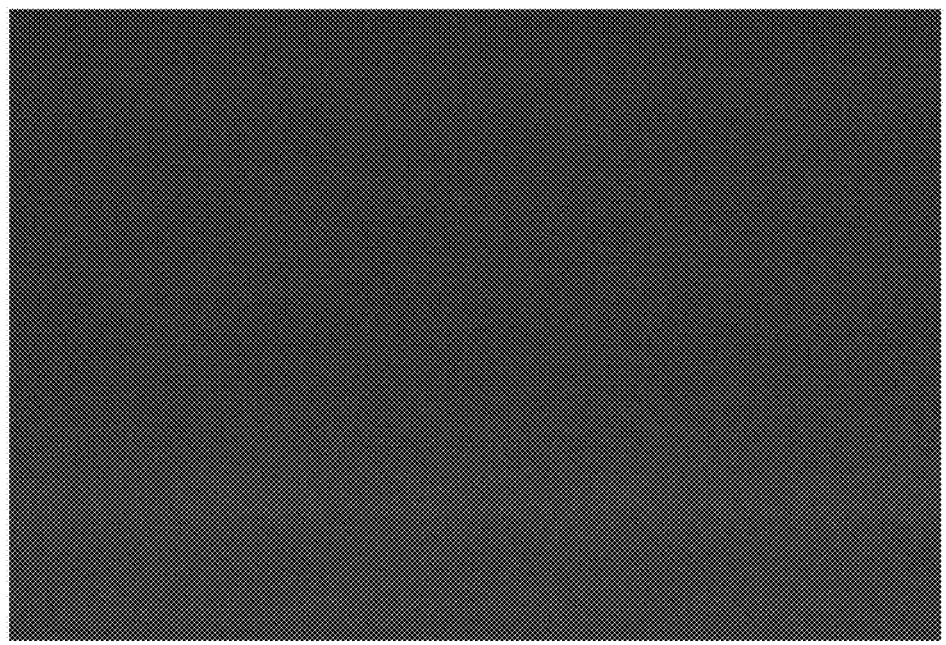
FIG. 7 is a scanning electron micrograph of a vertical alignment film of a liquid crystal display device shown in Comparative Example 1.

A liquid crystal display device was produced by using CLC-2 according to the method described above. However, in the step of irradiating the device with ultraviolet light in a state in which a rectangular alternating-current electric field of 7 V was applied between the common electrode and the pixel electrodes, an intensity of irradiation measured at a center wavelength of 365 nm by using an accumulated UV meter UIT-150 manufactured by Ushio Inc. was adjusted to 100 mW/cm², and ultraviolet light in an accumulated light quantity of 100 J/cm² was applied over 1,000 seconds. The pre-tilt angle of the liquid crystal display device measured before the ultraviolet irradiation step was 87.3°, and the pre-tilt angle of the liquid crystal display device measured after the ultraviolet irradiation step was 87.8°. The polymer produced by ultraviolet irradiation had a number-average molecular weight of 27,000 in terms of polystyrene. FIG. 7 shows the result of scanning electron microscope observation of the vertical alignment film of the liquid crystal display device of Comparative Example 1. Unlike in the examples, a state in which polymer fine particles adhere to the vertical alignment film was not observed.

Comparative Example 2

To 100% of the liquid crystal composition LC-2, 0.4% of polymerizable compound C represented by

[Chem. 21]

Figure 8:
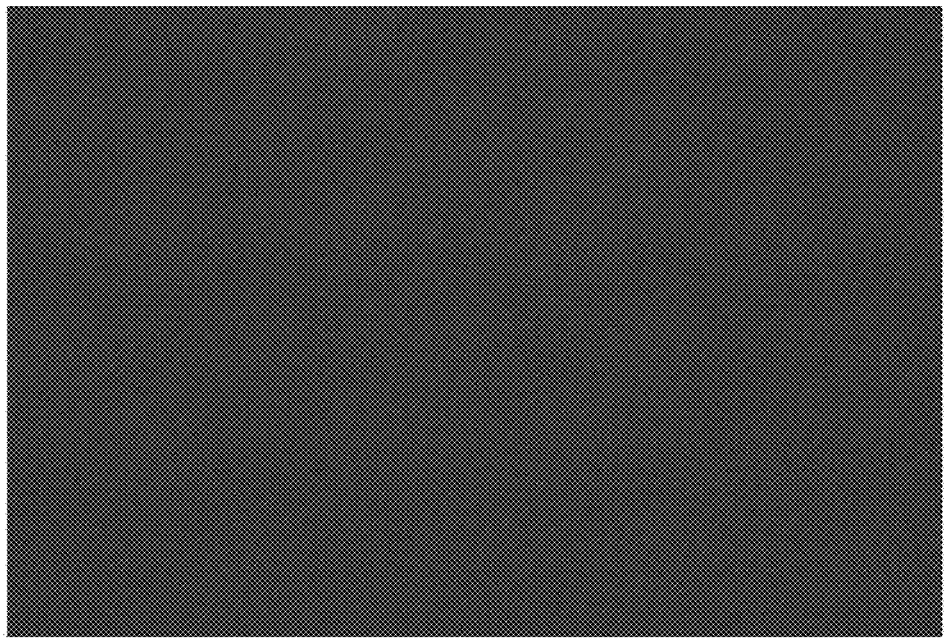
FIG. 8 is a scanning electron micrograph of a vertical alignment film of a liquid crystal display device shown in Comparative Example 2.

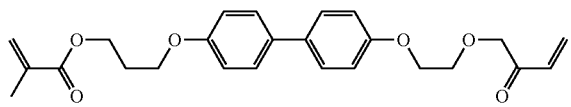

was added and uniformly dissolved to prepare polymerizable liquid crystal composition CLC-4. A liquid crystal display device was produced by using CLC-4 according to the method described above. However, in the step of irradiating the device with ultraviolet light in a state in which a rectangular alternating-current electric field of 7 V was applied between the common electrode and the pixel electrodes, an intensity of irradiation measured at a center wavelength of 365 nm by using an accumulated UV meter UIT-150 manufactured by Ushio Inc. was adjusted to 100 mW/cm², and ultraviolet light in an accumulated light quantity of 100 J/cm² was applied over 1000 seconds. The pre-tilt angle of the liquid crystal display device measured before the ultraviolet irradiation step was 87.5°, and the pre-tilt angle of the liquid crystal display device measured after the ultraviolet irradiation step was 89.0°. The polymer produced by ultraviolet irradiation had a number-average molecular weight of 2,200 in terms of polystyrene. FIG. 8 shows the result of scanning electron microscope observation of the vertical alignment film of the liquid crystal display device of Comparative Example 2. Unlike in the examples, a state in which polymer fine particles adhere to the vertical alignment film was not observed.

Comparative Example 3

Figure 9:
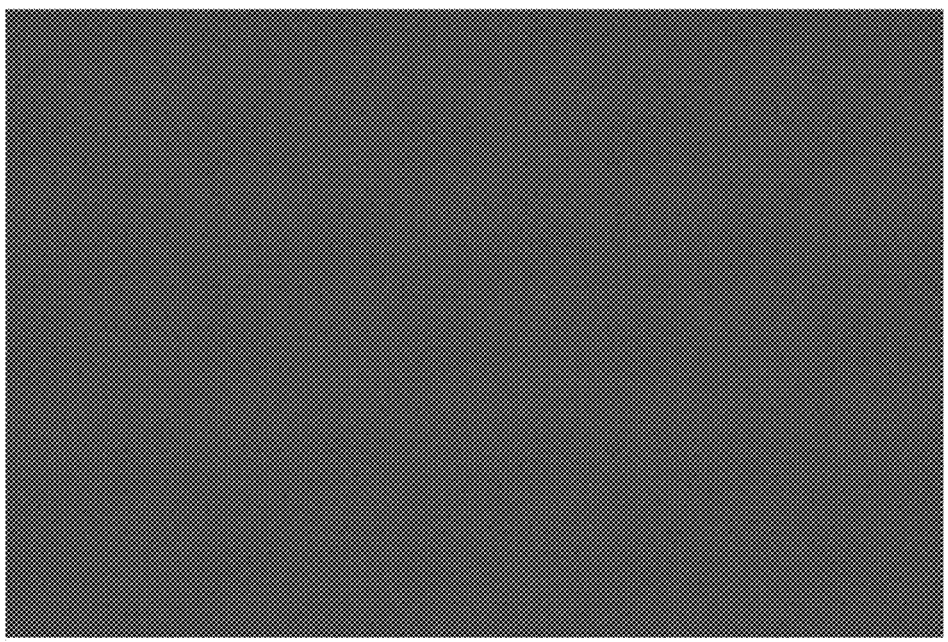
FIG. 9 is a scanning electron micrograph of a vertical alignment film of a liquid crystal display device shown in Comparative Example 3.

A liquid crystal display device was produced by using CLC-4 according to the method described above. However, in the step of irradiating the device with ultraviolet light in a state in which a rectangular alternating-current electric field of 7 V was applied between the common electrode and the pixel electrodes, an intensity of irradiation measured at a center wavelength of 365 nm by using an accumulated UV meter UIT-150 manufactured by Ushio Inc. was adjusted to 20 mW/cm², and ultraviolet light in an accumulated light quantity of 100 J/cm² was applied over 5000 seconds. The pre-tilt angle of the liquid crystal display device measured before the ultraviolet irradiation step was 87.5°, and the pre-tilt angle of the liquid crystal display device measured after the ultraviolet irradiation step was 88.3°. The polymer produced by ultraviolet irradiation had a number-average molecular weight of 1,600 in terms of polystyrene. FIG. 9 shows the result of scanning electron microscope observation of the vertical alignment film of the liquid crystal display device of Comparative Example 3. Unlike in the examples, a state in which polymer fine particles adhere to the vertical alignment film was not observed.

The results of the examples and comparative examples described above are summarized in Table 2. In Table 2, "Pre-tilt angle produced in ultraviolet irradiation step" represents a degree of decrease in the pre-tilt angle after the ultraviolet irradiation step as compared with that before the ultraviolet irradiation step, and the decrease is preferably a positive vale of 1 to 2° or more. Table 2 indicates that in any one of the liquid crystal display devices of Examples 1 to 3, the pre-tilt angle produced by the ultraviolet irradiation step is a positive value of 1 to 2° or more. On the other hand, in the liquid crystal display devices of Comparative Examples 1 to 3, the pre-tilt angle produced by the ultraviolet irradiation step is not a positive value but rather is a negative value (more vertical alignment). Therefore, the falling direction of liquid crystal molecules cannot be controlled, and thus the liquid crystal display device has poor quality such as the occurrence of display defects or the like.

The liquid crystal display devices of Examples 1 to 3 were greatly different from the liquid crystal display devices of Comparative Examples 1 to 3 in terms of the state of the polymerizable compound polymer formed on the vertical alignment film. In the liquid crystal display devices of Examples 1 to 3, many fine particles of the polymerizable compound polymer adhered to the vertical alignment films. On the other than, in the liquid crystal display devices of Comparative Examples 1 to 3, no fine particle of the polymerizable compound polymer was observed on the vertical alignment films. It is considered that in the liquid crystal display devices of Comparative Examples 1 to 3, no fine particle of the polymerizable compound polymer adhere to the vertical alignment film, and thus a preferred pre-tilt angle is not produced.

The results of number-average molecular weight measurement of the polymer indicate that the polymer in any one of the liquid crystal display devices of Examples 1 to 3 has a number-average molecular weight of 50,000 or more, while the polymer in any one of the liquid crystal display devices of Comparative Examples 1 to 3 has a number-average molecular weight of 50,000 or less. That is, it is considered that in any one of the liquid crystal display devices of Examples 1 to 3, the molecular weight of the polymer of the polymerizable compound is increased by ultraviolet irradiation, resulting in separation of the polymer from the liquid crystal composition and adhesion of fine particles to the vertical alignment film. On the other hand, it is considered that in any one of the liquid crystal display devices of Comparative Examples 1 to 3, the molecular weight of the polymer of the polymerizable compound is not sufficiently increased, thereby failing to result in separation from the liquid crystal composition and adhesion to the vertical alignment film. As described above, also the amount of the polymerizable compound remaining in the liquid crystal display devices of Comparative Examples 1 to 3 is less than the detection limit, and thus the completion of polymerization reaction was confirmed.

As described above, in the liquid crystal display device of the present invention containing a polymerizable compound polymer having a number-average molecular weight of 50,000 or more, the formation of a good pre-tilt angle can be achieved, and thus high display quality can be obtained.

TABLE 2

|  | Example 1 | Example 2 | Example 3 | Comparative Example 1 | Comparative Example 2 | Comparative Example 3 |
|---|---|---|---|---|---|---|
| Liquid crystal composition | LC-1 | LC-2 | LC-2 | LC-2 | LC-2 | LC-2 |
| Polymerizable compound | A | A | B | A | C | C |
| Intensity of irradiation at center wavelength of 365 nm [mW/cm²] | 100 | 20 | 100 | 100 | 100 | 20 |
| Number-average molecular weight of polymer | 75,000 | 495,000 | 608,000 | 27,000 | 2,200 | 1,600 |
| Adhesion of polymer fine particles to vertical alignment film surface | Yes | Yes | Yes | No | No | No |
| Pre-tilt angle before ultraviolet irradiation step [°] | 87.9 | 87.3 | 87.1 | 87.3 | 87.5 | 87.5 |
| Pre-tilt angle after ultraviolet irradiation step [°] | 81.3 | 85.2 | 85.4 | 87.8 | 89.0 | 88.3 |
| Pre-tilt angle formed in ultraviolet irradiation step [°] | 6.6 | 2.1 | 1.7 | −0.5 | −1.5 | −0.8 |

REFERENCE SIGNS LIST

10 . . . liquid crystal display device, 11 . . . first substrate, 12 . . . second substrate, 13 . . . liquid crystal composition layer, 14 . . . common electrode, 15 . . . pixel electrode, 16 . . . vertical alignment film, 17 . . . vertical alignment film, 18 . . . color filter, 19 . . . liquid crystal molecule

The invention claimed is:
1. A liquid crystal display device comprising:
a first substrate having a common electrode;
a second substrate having a pixel electrode;
a liquid crystal composition layer held between the first substrate and the second substrate, the liquid crystal composition layer made from a mixture of a liquid crystal composition and a polymerizable compound, and
a vertical alignment film provided on at least one of the first substrate and the second substrate, an alignment direction of liquid crystal molecules in the liquid crystal composition layer being controlled by the vertical alignment film to be substantially vertical to the first substrate and the second substrate on the sides adjacent to the liquid crystal composition layer,
wherein the polymerizable compound has been polymerized into a polymer through an ultraviolet irradiation step by irradiating ultraviolet light in a condition where a voltage is applied between the common electrode and the pixel electrode such that the voltage is applied substantially vertical to the first substrate and the second substrate, the polymer being adhered to the vertical alignment film;
wherein the polymer has a number-average molecular weight of 50,000 or more in terms of polystyrene,
wherein the liquid crystal composition comprises:
a compound represented by general formula (Ia), and
a compound represented by general formula (IV),

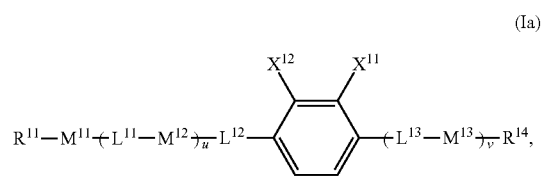

wherein in the general formula (Ia), $R^{11}$ represents an alkenyl group having 2 to 10 carbon atoms, one or two or more unadjacent methylene groups present in the group can be substituted by —O— or —S—, one or two or more hydrogen atoms present in the group can be substituted by a fluorine atom or chlorine atom; $R^{14}$ represents an alkyl group having 1 to 10 carbon atoms or an alkenyl group having 2 to 10 carbon atoms, one or two or more unadjacent methylene groups present in the group can be substituted by —O— or —S—, one or two or more hydrogen atoms present in the group can be substituted by a fluorine atom or chlorine atom; u and v each independently represent 0, 1, or 2, and u +v is 2 or less,
$M^{11}$, $M^{12}$, and $M^{13}$ each independently represent a group selected from the group consisting of
(a) a trans-1,4-cyclohexylene group (one methylene group or two or more unadjacent methylene groups present in the group can be substituted by —O— or —S—);
(b) a 1,4-phenylene group (one —CH= or unadjacent two or more —CH= present in the group can be substituted by a nitrogen atom); and (c) a 1,4-cyclohexenylene group, a 1,4-bicyclo(2.2.2)octylene group, a piperizine-2,5-diyl group, a naphthalene-2,6-diyl group, a 1,2,3,4-tetrahydronaphthalene-2,6-diyl group, and a decahydronaphthalene-2,6-diyl group, hydrogen atoms contained in the group (a), the group (b), or the group (c) can be each substituted by a cyano group, a fluorine atom, a trifluoromethyl group, a trifluoromethoxy group, or a chlorine atom; when a plurality of each of $M^{12}$ and $M^{13}$ are present, each can be the same or different; $L^{11}$, $L^{12}$ and $L^{13}$ each independently represent a single bond, —COO—, —OCO—, —CH$_2$CH$_2$—, —(CH$_2$)$_4$—, —OCH$_2$—, —CH$_2$O—, —OCF$_2$—, —CF$_2$O—, or —C≡C—; and when a plurality of $L^{11}$ and $L^{13}$ are present, these can be the same or different; and $X^{11}$ and $X^{12}$ each independently represent a trifluoromethyl group, a trifluoromethoxy group, or a fluorine atom,

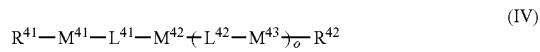

wherein in the general formula (IV), $R^{41}$ and $R^{42}$ each independently represent an alkyl group having 1 to 10 carbon atoms or an alkenyl group having 2 to 10 carbon atoms, one methylene group or two or more unadjacent methylene groups present in the group can be substituted by —O— or —S—, one or two or more hydrogen atoms present in the group can be substituted by a fluorine atom or chlorine atom;

o represents 0, 1, or 2;

$M^{41}$, $M^{42}$, and $M^{43}$ each independently represent a group selected from the group consisting of
(d) a trans-1,4-cyclohexylene group (one methylene-group or two or more unadjacent methylene groups present in the group can be substituted by —O— or —S—);
(e) a 1,4-phenylene group (one —CH═ or unadjacent two or more —CH═ present in the group can be substituted by a nitrogen atom), a 3-fluoro-1,4-phenylene group, and a 3,5-difluoro-1,4-phenylene group; and
(f) a 1,4-cyclohexenylene group, a 1,4-bicyclo(2.2.2)octylene group, a piperizine-2,5-diyl group, a naphthalene-2,6-diyl group, a decahydronaphthalene-2,6-diyl group, and a 1,2,3,4-tetrahydronaphthalene-2,6-diyl group; when a plurality of $M^{43}$ are present, they can be the same or different;

$L^{41}$ and $L^{42}$ each independently represent a single bond, —CH$_2$CH$_2$—, —(CH$_2$)$_4$—, —OCH$_2$—, —CH$_2$O—, —OCF$_2$—, —CF$_2$O—, —CH═CH—, —CH═N—N═CH—, or —C≡C—; and when a plurality of $L^{42}$ are present, they can be the same or different, wherein the polymerizable compound is a compound having two or more polymerizable groups, and is represented by general formula (II):

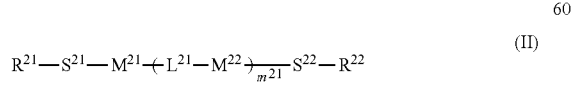

wherein in the general formula (II), $R^{21}$ and $R^{22}$ each independently represent a polymerizable group, $S^{21}$ and $S^{22}$ each independently represent a spacer group or a single bond, $L^{21}$ represents a linking group or a single bond, $M^{21}$ and $M^{22}$ each independently represent a 1,4-phenylene group, a naphthalene-2,6-diyl group, an anthracene-2,6-diyl group, or a phenathrene-2,7-diyl group, which may be unsubstituted, or in which a hydrogen contained in the group may be substituted by a fluorine atom, a chlorine atom, an alkyl group having 1 to 8 carbon atoms, a halogenated alkyl group, a halogenated alkoxy group, an alkoxy group, a nitro group, or

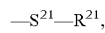

when a plurality of $M^{22}$ are present, they may be the same or different, and $m^{21}$ is 0, 1, 2, or 3, and wherein a decrease of pre-tilt angle after the ultraviolet irradiation step is a positive value of 1° or more and less than 6.6°, the decrease of pre-tilt angle equals: (the pre-tilt angle before the ultraviolet irradiation step) minus (the pre-tilt angle after the ultraviolet irradiation step).

2. The liquid crystal display device according to claim 1, wherein the mixture of the polymerizable compound and the liquid crystal composition is irradiated with ultraviolet light at a center wavelength of 365 nm with an intensity of irradiation of 5 mW/cm² to 50 mW/cm².

3. The liquid crystal display device according to claim 1, wherein the polymerizable compound is the compound represented by the general formula (II):

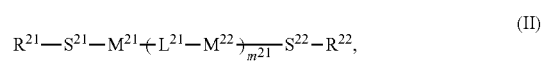

in the formula, $R^{21}$ and $R^{22}$ each independently represent any one of formula (R-1) to formula (R-15) below,

-continued (R-8) 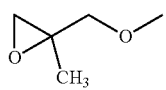

(R-9) 

(R-10) 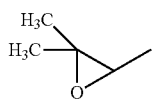

(R-11) 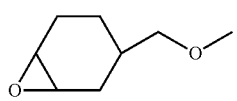

(R-12) 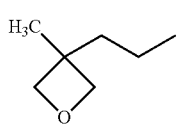

(R-13) 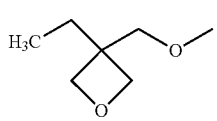

-continued (R-14) 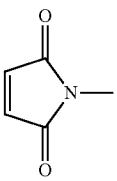

(R-15) HS——·

$S^{21}$ and $S^{22}$ each independently represent an alkyl group having 1 to 12 carbon atoms or a single bond, a methylene group in the alkyl group may be substituted by an oxygen atom, —COO—, —OCO—, or —OCOO— so that oxygen atoms are not directly bonded to each other, $L^{21}$ represents a single bond, —O—, —CH$_2$—, —OCH$_2$—, —CH$_2$O—, —CO—, —C$_2$H$_4$—, —COO—, —OCO—, 13 CH=CH—COO—, —COO—CH=CH—, —OCO—CH=CH—, —CH=CH—OCO—, —COOC$_2$H$_4$—, —OCOC$_2$H$_4$—, —C$_2$H$_4$OCO—, —C$_2$H$_4$COO—, —OCOCH$_2$—, —CH$_2$COO—, —CH=CH—, —CF=CH—, —CH=CF—, —CF=CF—, —CF$_2$—, —CF$_2$O—, —OCF$_2$—, —CF$_2$CH$_2$—, CH$_2$CF$_2$13 , —CF$_2$CF$_2$—, or —C≡C—, when a plurality of $L^{21}$ are present, they may be the same or different.

4. The liquid crystal display device according to claim 1, wherein the decrease of pre-tilt angle after the ultraviolet irradiation step is a positive value of 1° or more and less than 2.1°.

* * * * *